United States Patent
Badea et al.

(10) Patent No.: US 9,836,379 B2
(45) Date of Patent: Dec. 5, 2017

(54) METHOD AND SYSTEM FOR GENERATING A MEMORY TRACE OF A PROGRAM CODE EXECUTABLE ON A PROGRAMMABLE TARGET

(75) Inventors: Dragos Badea, Bucharest (RO); Andrei Mihaila, Bucharest (RO)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/397,189

(22) PCT Filed: Apr. 26, 2012

(86) PCT No.: PCT/IB2012/052093
§ 371 (c)(1),
(2), (4) Date: Oct. 25, 2014

(87) PCT Pub. No.: WO2013/160732
PCT Pub. Date: Oct. 31, 2013

(65) Prior Publication Data
US 2015/0082284 A1    Mar. 19, 2015

(51) Int. Cl.
*G06F 9/44*    (2006.01)
*G06F 11/34*   (2006.01)
*G06F 11/36*   (2006.01)

(52) U.S. Cl.
CPC ...... *G06F 11/3471* (2013.01); *G06F 11/3636* (2013.01); *G06F 11/3644* (2013.01); *G06F 2201/865* (2013.01); *G06F 2201/88* (2013.01)

(58) Field of Classification Search
CPC ........ G06F 8/20; G06F 8/443; G06F 11/3636; G06F 11/3644; G06F 12/023; G06F 8/445; G06F 9/45504; G06F 11/3471; G06F 2201/88
See application file for complete search history.

(56) References Cited

U.S. PATENT DOCUMENTS

| | | | |
|---|---|---|---|
| 6,321,379 B1 * | 11/2001 | Callahan, II | G06F 8/445 717/141 |
| 6,347,383 B1 | 2/2002 | Elnozahy | |
| 6,360,360 B1 * | 3/2002 | Bates | G06F 8/443 717/130 |
| 6,513,154 B1 * | 1/2003 | Porterfield | G06F 8/20 717/101 |
| 7,367,024 B2 | 4/2008 | Barua et al. | |
| 7,721,267 B2 | 5/2010 | Agarwala | |
| 7,926,046 B2 | 4/2011 | Halambi et al. | |
| 9,477,577 B2 | 10/2016 | Baca | |
| 2004/0103401 A1 * | 5/2004 | Chilimbi | G06F 11/3612 717/130 |

(Continued)

OTHER PUBLICATIONS

Agarwal et al, "New Technique for Capturing Address Traces Using Microcode", IEEE 1986, pp. 119-127 <AddrTraces_86.pdf>.*

(Continued)

*Primary Examiner* — Tuan Vu

(57) ABSTRACT

A method of generating an instrumented code from a program code executable on a programmable target is described. The method comprises analyzing the program code to detect a loop nest with regular memory access in the program code, providing a record of static memory address information associated with the loop nest, and instrumenting the program code to provide an instrumented code corresponding to the program code supplemented with an instrumentation instruction to output an information message comprising a dynamic memory address information field formatted to store a dynamic memory address information associated with the loop nest.

8 Claims, 6 Drawing Sheets

(56) References Cited

U.S. PATENT DOCUMENTS

| | | | |
|---|---|---|---|
| 2005/0091644 A1* | 4/2005 | Chilimbi | G06F 11/3644 717/128 |
| 2006/0242627 A1* | 10/2006 | Wygodny | G06F 11/3636 717/128 |
| 2008/0250401 A1 | 10/2008 | Puri et al. | |
| 2010/0031238 A1 | 2/2010 | Li et al. | |
| 2010/0110745 A1 | 5/2010 | Jeddeloh et al. | |
| 2010/0192138 A1* | 7/2010 | Leung | G06F 12/023 717/150 |
| 2012/0304172 A1* | 11/2012 | Greifeneder | G06F 9/45504 718/1 |

OTHER PUBLICATIONS

International Search Report and Written Opinion correlating to PCT/IB2012/052093 dated Jan. 31, 2013.

Jaydeep, M. et al: "METRIC: Memory Tracing Via Dynamic Binary Rewriting to Identify Cache Inefficiencies", Journal of ACM Transactions on Programming Languages and Systems (TOPLAS), vol. 29, No. 2, Apr. 2007, Article No. 12.

Marathe, Jaydeep P.: "Trace Based Performance Characterization and Optimization", PhD Thesis, Computer Science, Raleigh,NC, 2007, pp. 1-202.

C. Kao, et al: "A Hardware Approach to Real-Time Program Trace Compression for Embedded Processors", IEEE Transactions on Circuits and Systems—I: Regular Papers, Vol. 54, No. 3, Mar. 2007, pp. 530-543.

Ayers et al: "TraceBack: First Fault Diagnosis by Reconstruction of Distributed Control Flow", ACM Conference on Programming Language Design and Implementation, pp. 1-12.

Claudio Riva et al: "Combining Static and Dynamic Views for Architecture Reconstruction", Proceedings of the Sixth European Conference on Software Maintenance and Reengineering (CSMR?02), Mar. 11, 2002-Mar. 13, 2002, pp. 47-55.

\* cited by examiner

METHOD AND SYSTEM FOR GENERATING A MEMORY TRACE OF A PROGRAM CODE EXECUTABLE ON A PROGRAMMABLE TARGET

FIELD OF THE INVENTION

This invention relates to a method of generating a memory trace of a program code executable on a programmable target, an associated method of generating an instrumented code, associated systems and components and associated computer program products.

BACKGROUND OF THE INVENTION

Many systems include a processor with intensive memory access during operation of the system. When such systems are developed, a lot of attention usually needs to be given to determine memory usage requirements, e.g. as to memory bandwidth and memory size requirements, to enable a fault-free operation of the system. Hereto, memory trace collection is commonly used to map the memory accesses of the system using different test scenarios representing the system during practical use. Different schemes of memory trace collection are known to obtain a memory trace of a program code executable on a programmable target. Typically, known schemes are adversely affected by hardware limitations, such as trace buffer size or trace data transfer bandwidth, which may e.g. adversely affect the range of scenarios that may be tested and/or which may prevent operation of the programmable target at real-time speed. Prior art systems therefore typically use a memory trace corresponding to very brief period of operation, or use only a partial access trace for a user-selected part of the program code.

For example, publication "METRIC: Memory Tracing via Dynamic Binary Rewriting to Identify Cache Inefficiencies" by Jaydeep Marathe et al in *ACM Transactions on Programming Languages and Systems*, Volume 29 Issue 2, April 2007 (hereafter briefly referred to as "METRIC") describes a framework for extracting partial access traces based on dynamic binary rewriting of the executing application. The authors of METRIC instrument memory access instructions to precisely capture the data access stream of the target application, and the user may activate or deactivate tracing so that data reference streams are selectively generated. Partial memory traces may hereby be captured.

METRIC also describes an algorithm for compressing these partial memory traces. The algorithm generates constant space representations for regular accesses occurring in nested loop structures. The algorithm detects, during the execution of the target application, streams of regular accesses generated at a given access point from inspection of the memory accesses performed. METRIC is however capable of and intended for gathering partial access traces, where the overhead of trace compression is limited by the duration of monitoring. In practice, as the authors of METRIC explicitly indicate at the end of section 5, such scheme might only be acceptable as long as the trace collection period is short.

Another method for compressing a complete memory address trace is described in U.S. Pat. No. 6,347,383 B1. U.S. Pat. No. 6,347,383 B1 describes a method and system for compressing an existing trace during post-mortem through detecting and reducing the loops that manifest in an address trace. The method and system described in U.S. Pat. No. 6,347,383 B1 may however require a large trace data transfer bandwidth, as it uses a full existing trace for compression post-mortem.

SUMMARY OF THE INVENTION

The present invention provides a method of generating an instrumented code from a program code executable on a programmable target, a method of generating a memory trace of a program code executable on a programmable target, a system for generating a memory trace of a program code executable on a programmable target, components for such system, and computer program products as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
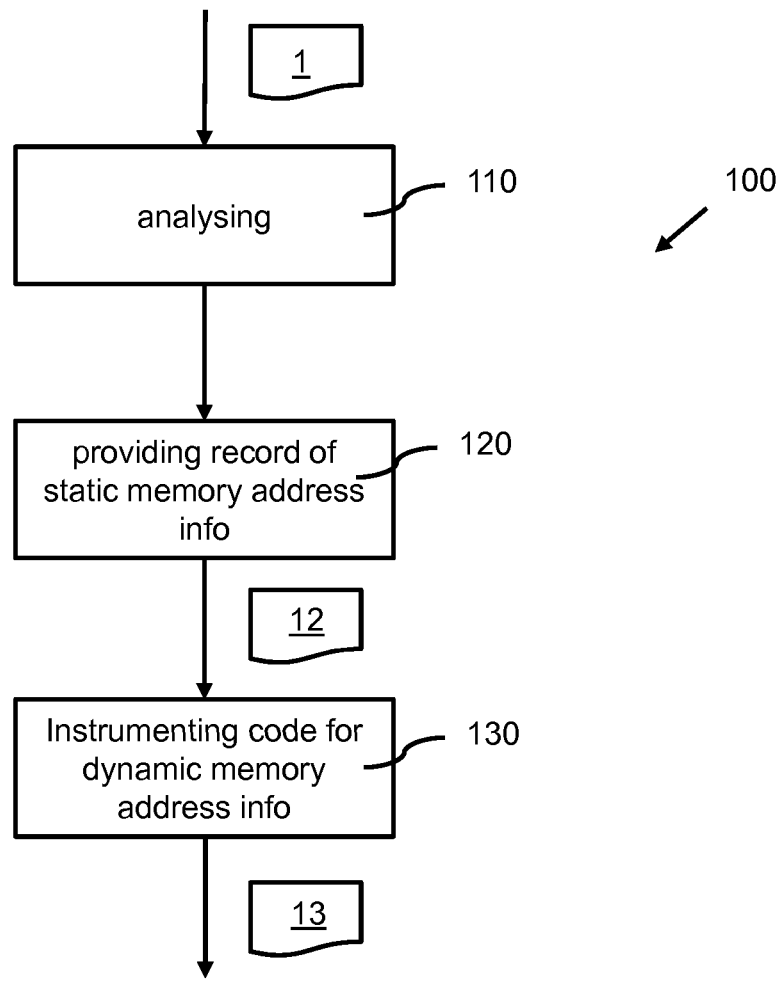
FIG. 1 schematically shows an example of an embodiment of a method.

FIG. 1 schematically shows an example of an embodiment of a method 100 of generating an instrumented code 13 from a program code 1 executable on a programmable target 2. The method comprises analysing 110 the program code to detect a loop nest with regular memory access in the program code. For detecting a loop nest, several methods are known to a person skilled in the art. Reference may e.g. be made to the book "*Compilers Principles, Techniques, and Tools*" by Alfred V. Aho, Ravi Sethi and Jeffrey D. Ullman (Addison-Wesley, 1986). The analysing 110 may use a control flow graph and dominator tree information. Regular memory access may relate to any memory access patterns that correspond to any function dependent on only a start address and iteration variables in the loop nest. The function may e.g. be schematically represented as (src+f(i, j, . . . ) i=0 . . . N−1, j=0 . . . M−1, . . . for a loop nest with start address src and iteration variables i running from 0 to N−1, j running from 0 to M−1, . . . . For example, consider a one-level loop nest with start address src, iteration variable i running from 0 to N−1 and has successive access of successive memory addresses, the function may e.g. be represented as (src+i) i=0 . . . N−1. As another example, consider a two-level loop nest with start address src and iteration variables i and j, the two-level loop could, depending on its construction, e.g. have a memory access pattern of which the function may e.g. be represented as (src+N*i+j) i=0 . . . N−1, j=0 . . . N−1 or, for another loop construction, (src+(i power j)), i=0 . . . N−1, j=0 . . . N−1. Regular memory access may relate to a pre-determined set of memory access patterns that corresponds to a pre-determined plurality of functions dependent on only a start address and iteration variables in the loop nest. The method further comprises providing 120 a record 12 of static memory address information 121 associated with the loop nest. The term static memory address information may relate to information associated with the loop nest that is static in the sense that the information may be represented in an instantiation-independent manner. Thus, static memory address information may relate to information that is equal for any instantiation of the loop nest during execution of the program code. Part of the static memory address information may be determinable directly from the program code, e.g. a memory access pattern may be easily detectable for some code. Another part of the static memory address information, e.g. an instruction address related to the loop nest, may be determinable from compiling the program code.

The method further comprises instrumenting 130 the program code 1 to provide an instrumented code 13. The term instrumenting may relate to inserting instrumentation instructions in the program code. In prior art systems, instrumenting may be e.g. done by a software designer during development of the program code to provide debug information to the software designer during development, while the software designer removes the instrumentation instructions after he considers the development of the program code complete. In the embodiment, the instrumentation code 13 corresponds to the program code, supplemented with an instrumentation instruction to output an information message 14.

The information message 14 comprises a dynamic memory address information field 140 formatted to store a dynamic memory address information associated with the loop nest. The term dynamic memory address information may relate to information associated with the loop nest that is dynamic in the sense that the information may be different for different instantiations of the loop nest. Thus, dynamic memory address information may relate to information that may only be determined at each instantiation of the loop nest during execution of the program code. At least part of the dynamic memory address information may thus correspond to runtime values associated with at least part of the static memory access information.

The instrumentation instruction may be included in the program code at a loop nest entry position, or at a loop nest exit position, to obtain the instrumented code, such that the instrumentation instruction is executed only once per instantiation of the loop nest, in contrast to known methods of instrumentation where an instrumentation instruction is executed inside the loop nest and thereby executed multiple times, typically for each iteration of the loop nest. The instrumentation instruction will, once the program code is compiled and loaded in the programmable target 2, cause the programmable target 2 to output the information message 14.

The information message 14 may be a real-time message, arranged to be send by the programmable target 2 to the host or another component real-time. The information message 14 may alternatively be buffered in a message cache on the programmable target 2, and retrievable from the message cache to be send by the programmable target 2 to the host or another component in bursts. The another component may e.g. be an information collector 1600 as described below. The method 100 may be performed on a host computer. The instrumenting 130 may be performed automatically. The method 100 is thus arranged to provide static memory address information associated with a loop nest in the program code and, when the program code is executed on the programmable target, information messages from the programmable target, the information messages being associated with dynamic memory address information corresponding to instantiations of the loop nest. The dynamic memory address information may hereby result in a reduced bandwidth usage during execution on the programmable target compared to prior art memory trace collection methods. Also, trace buffer size on the programmable target may hereby be reduced and/or overhead of instrumentation code on the execution time may be reduced compared to at least some prior art memory trace collection methods. Reducing overhead may e.g. be advantageous for better correspondence between real-time performance of the code with and without instrumentation.

Figure 2:
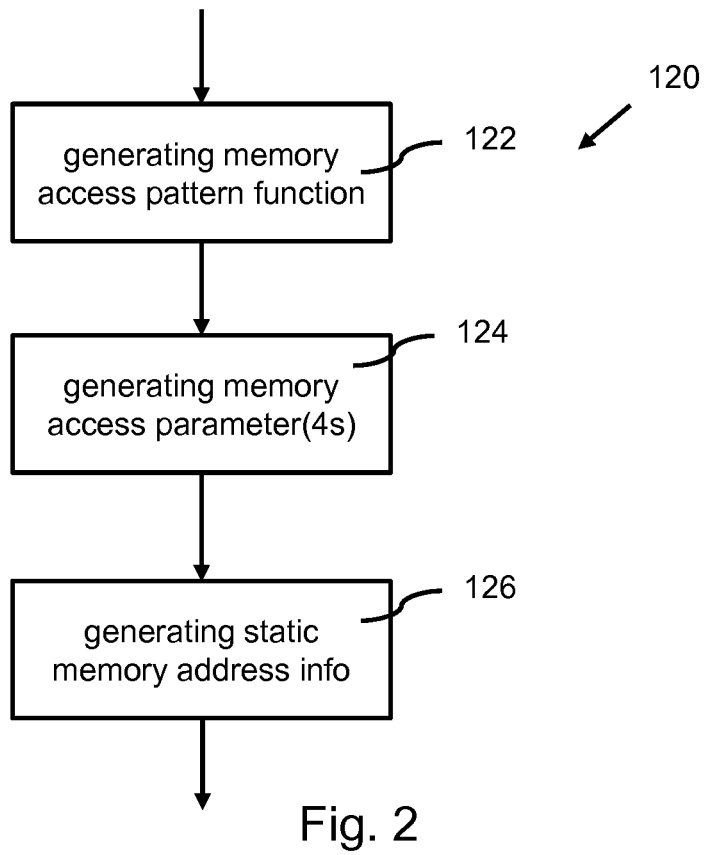
FIG. 2 schematically shows an example of details of an embodiment of a method.
Figure 3A:
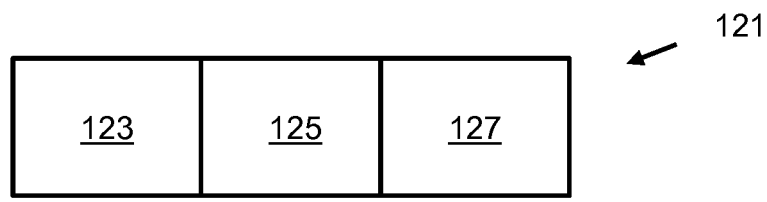
FIG. 3a and FIG. 3b schematically show a static memory address information and a dynamic address information.
Figure 3B:
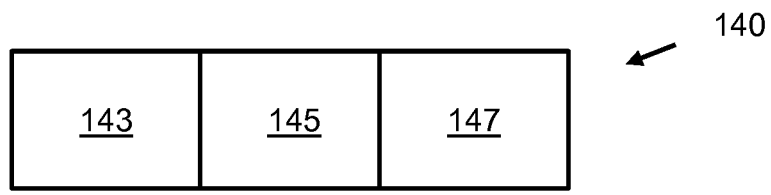

FIG. 2 shows an embodiment of the action of providing 120 the record 12 of static memory address information. FIG. 3a and FIG. 3b schematically show a static memory address information and a dynamic address information corresponding to this embodiment. In this embodiment, the providing 120 the record 12 of static memory address information 121 associated with the loop nest comprises generating 122 a memory access pattern function 123 as a function describing a memory address pattern of the loop nest in terms of a start address src and a loop iteration variable i. If the loop nest is a k-dimensional loop nest, where k is the level of the innermost loop in the loop nest, the iteration variable may refer to all iteration variables of the loop nest which may be characterized by a lower limit, an upper limit and a stepsize of the respective iteration variable, such that the lower limit, upper limit and stepsize are invariant for the loop at the respective level. The memory access pattern may correspond to incremental access of integers at subsequent memory addresses, starting from start address src and incrementing one-at-a-time: such memory address pattern may e.g. be indicated with a function schematically indicated as (src+i). The action 120 further comprises generating 124 memory access pattern parameters representing at least an instruction address 125 and a size 127 of a memory access. The size 127 of the memory access corresponds to e.g. the number of bytes of the memory access, and may be expressed e.g. as a number of memory byte positions (1, 2, 4, . . . ) or as a type (byte, int, long, . . . ). The action further comprises generating 126 the static memory address information 121 from at least the memory access pattern function and the memory access pattern parameters. The record of static memory address information may hereby provide an efficient representation of memory addresses in a loop nest in the program code.

According to an embodiment, the instrumenting 130 comprises formatting 132 the dynamic memory address information field 140 to allow storing the dynamic memory address information 141, the dynamic memory address information representing at least a runtime value of the instruction address, a runtime value of the start address and a runtime value of an iteration count of loop variables of the loop nest in respective information fields 143, 145, 147, as indicated in FIG. 3b. When the program code is executed on the programmable target, the programmable target may thus store the runtime value of the instruction address, the runtime value of the start address and the runtime value of the iteration counter as dynamic memory address information at each instantiation of the loop nest. The dynamic address information may thus represent the values of lower limit, upper limit and stepsize of the respective iteration variable associated with the static memory address information of the loop nest for each instantiation of the loop nest. The dynamic memory address information may hereby provide an efficient representation of the memory access in the loop nest, as it only comprises a small number of runtime values for each loop nest instead of an extensive record of all individual memory addresses accessed during the execution. The necessary bandwidth to output the memory trace from the hardware target may hereby be efficiently reduced. Further, the method differs from METRIC at least in that the method may obviate the need to inspect actual memory accesses at a given access point to find streams of regular accesses generated at the given access point, and may thereby obviate the need to have resources available to perform this inspection. The overhead of the instrumentation code on the execution time may thus be reduced and/or the need for specific inspection points where the execution will hold may be obviated.

Figure 4:
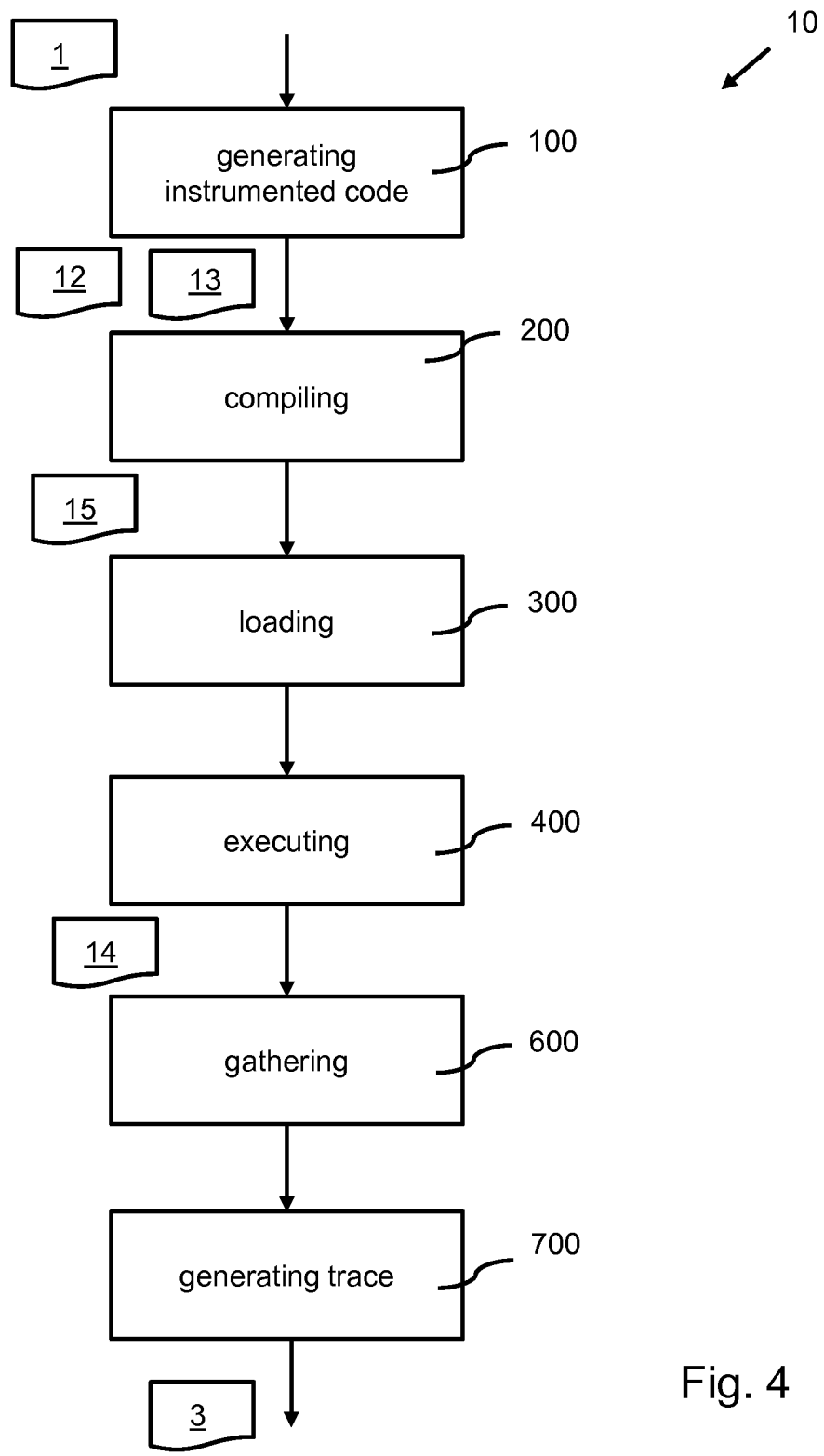
FIG. 4 schematically shows an example of an embodiment of a method.
Figure 5:
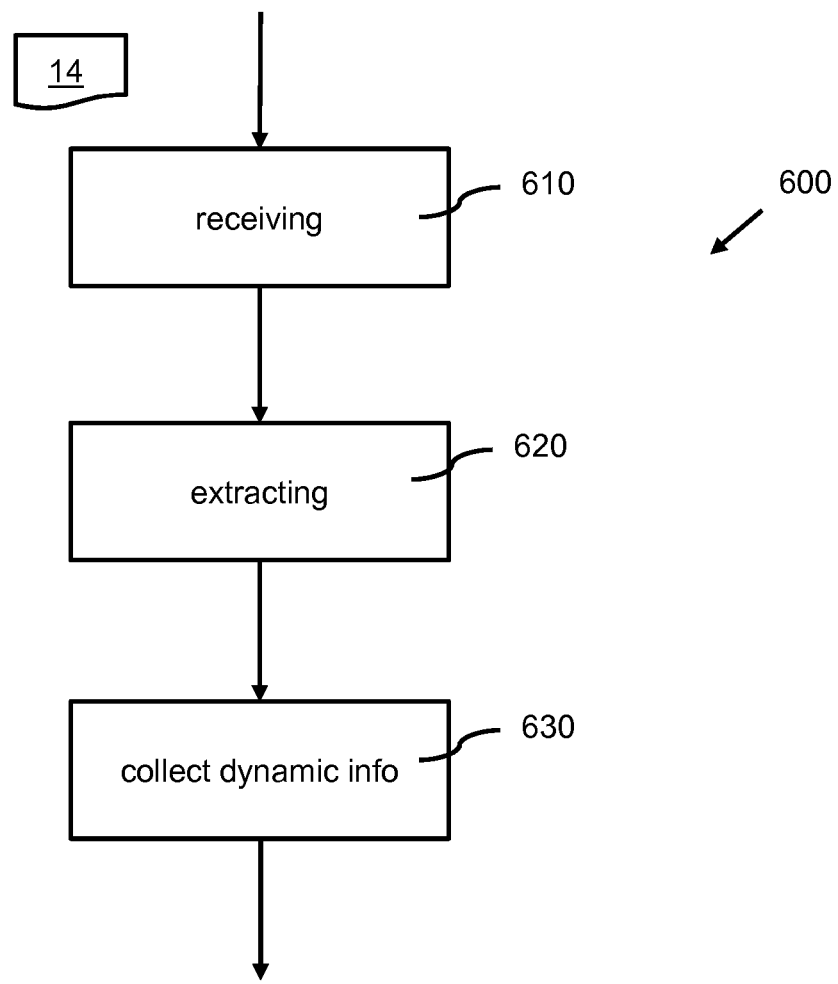
FIG. 5 schematically shows an example of details of an embodiment of a method.

FIG. 4 schematically shows an example of an embodiment of a method 10 of generating a memory trace 3 of a program code 1 executable on a programmable target 2. The method comprises performing a method 100 of generating an instrumented code from the program code according to any one of the embodiments described above. The method thus comprises analysing 110 the program code 1 to detect a loop nest with regular memory access in the program code 1, providing 120 a record 12 of static memory address information 121 associated with the loop nest, and instrumenting 130 the program code 1 to provide an instrumented code 13 comprising the program code supplemented with an instrumentation instruction to output an information message 14 comprising a dynamic memory address information field 140 formatted to store a dynamic memory address information associated with the loop nest. FIG. 4 shows that the method further comprises compiling 200 the instrumented code to obtain an instrumented executable program 15. The instrumented executable program 15 may be directly obtained from the compiling 200, or may be obtained after a linking to further include executable library code in the instrumented executable program 15. The instrumented executable program 15 is arranged to be executed on the programmable target 2 having been loaded in the programmable target 2. The method further comprises loading 300 the instrumented executable program 15 in the programmable target 2 and executing 400 the instrumented executable program 15 on the programmable target 2. During the executing on the programmable target 2, the method comprises letting 500 the programmable target store the dynamic memory address information 141 in the dynamic memory address information field 140 and letting the programmable target 2 send the information message and gathering 600 the dynamic memory address information 140 to obtain a record 149 of the dynamic memory address information. Hereby, a record 140 of dynamic memory address information is obtained that is associated with the record 12 of static memory address information as obtained from the analysing. The gathering 600 may comprise at least one sequence of receiving 610 the information message comprising the dynamic memory address information field storing the dynamic memory address information from the programmable target and extracting 620 the dynamic address information from the information message. The gathering 600 comprises collecting 630 the dynamic memory address information as extracted from the information message(s) to obtain a record 149 of the dynamic memory address information. The method further comprises generating 700 the memory trace from at least combining the record of static memory address information and the record of the dynamic address information. Generating 700 the memory trace in full may thus be performed on a host machine which executes the method 10, while the bandwidth to output all information necessary to reconstruct the memory trace in full may be reduced as the information messages with dynamic memory address information may use a reduced bandwidth.

All actions 100, 200, 300, 400, 600 and 700 may be performed immediately successively in the presence of the programmable target 2, which may further be referred to as online. Alternatively, some of the actions may be performed during one time period during which the programmable target may or may not be present, while other actions may be performed at another time period during which the programmable target 2 is present. Actions performed while the programmable target is not present, or not necessarily present, may be performed offline or post-portem. The actions of generating 100, compiling 200 and generating 700 may e.g. be performed offline or online. The actions of loading 300, executing 400 and gathering 600 may be performed online using a host machine. Performing the action of generating 700 offline may allow to store the record of static memory address information and the record of dynamic memory address information instead of the full memory trace, whereby not only the bandwidth from the programmable target 2 to the host machine may be reduced, but also the offline storage space.

The method may be schematically illustrated with an example. As a first example, consider the following schematic code fragment:

```
int simplesum(int* src, int N){
    int i, sum =0;
    for (i=0; i<N; i++){
        sum += *src; src ++;
    }
    return sum;
}
```

An embodiment may analyse this code fragment to identify a loop nest corresponding to an iteration of adding N values obtained from subsequent memory locations, starting at start address src and with a size of each memory access corresponding to an int. A memory access pattern of the loop nest may be described by a function of the start address src and the loop iteration variable i as (src+i), where i=0 . . . N−1. The loop nest is further associated with an instruction address. Static memory address information associated with the loop nest may thus schematically be indicated as:

```
Instruction address
Size of each memory access: size(int)
Access Pattern: (src + i)
Where i = 0..N−1
``` and included in the record of static memory address information.

An embodiment may instrument this code an instrumentation instruction to output an information message 14 comprising a dynamic memory address information field 140 formatted to store a dynamic memory address information representing at least a runtime value of the instruction address, a runtime value of the start address and a runtime value of an iteration count of loop variables of the loop nest in respective information fields 143, 145, 147. The instrumentation instruction could thus e.g. be in a form:

```
output_message([runtime value of instruction address],
               [runtime value of start address],
               [runtime value of N])
```

The instrumentation instruction may be included in the program code at a loop nest entry position, or at a loop nest exit position, to obtain the instrumented code. Hereby, the instrumentation instruction is executed only once per instantiation of the loop nest, in contrast to known methods of instrumentation where an instrumentation instruction is executed inside the loop nest and thereby executed multiple times, typically for each iteration of the loop nest.

When the instrumented code is executed on the programmable target, the instrumentation instruction to output this information message 14 will be executed once during execution of the loop nest is executed. Hereby, a single information message 14 from the programmable target provides all necessary runtime values associated with the static memory address information of the loop nest, allowing to reconstruct the full memory trace of the loop nest by combining the static memory address information with the dynamic address information that may be extracted from the information message 14. This may be compared with a prior art example, where memory access information is to be provided by the programmable target at each iteration of the loop, which corresponds to a much larger amount of trace information. Such prior art implementation may typically comprise tracing each individual memory access in the memory trace. i.e. comprising a runtime value of the instruction address and a full list of N runtime values of the memory addresses

```
{[runtime value of instruction address],
   src_start, src_start + size(int), src_start + 2 * size(int),
                          .., src_start + (N − 1) * size(int)}
```

For a 1 k memory access, the proposed method has been demonstrated to result in a reduction with a factor of about 500 compared to such exemplary corresponding prior art implementation for the simplesum example described above. It may be remarked that alternative prior art methods may use a Level-Zip compression to compress the memory access trace. Compared to such prior art methods, the improvement has been demonstrated to be roughly a factor of 100 for the simplesum example described above.

As a second example, a triangular matrix access code fragment may be considered:

```
int triang(int* src, int N){
   int i, sum =0;
   for (i=0; i<N; i++){
      for (j=i; j<N; j++){
         sum += (src[N*i+j]);
      }}
   return sum;
}
```

For this code fragment, a memory access pattern of the loop nest may be described by a function of the start address src and the loop iteration variables i and j as (src+N*i+j), where i=0 . . . N−1 and j=0 . . . N−1. Static memory address information associated with the loop nest may thus schematically be indicated for this code fragment as:

```
Instruction address
Size of each memory access: size(int)
Access Pattern: (src+N*i+j)
Where i = 0..N−1, j = i..N−1
``` and included in the record of static memory address information. E.g., for a 32 k memory access, the proposed method may result in a reduction with a factor of larger than 5000 when compared to an exemplary corresponding prior art implementation for the triang example described above.

Figure 6:
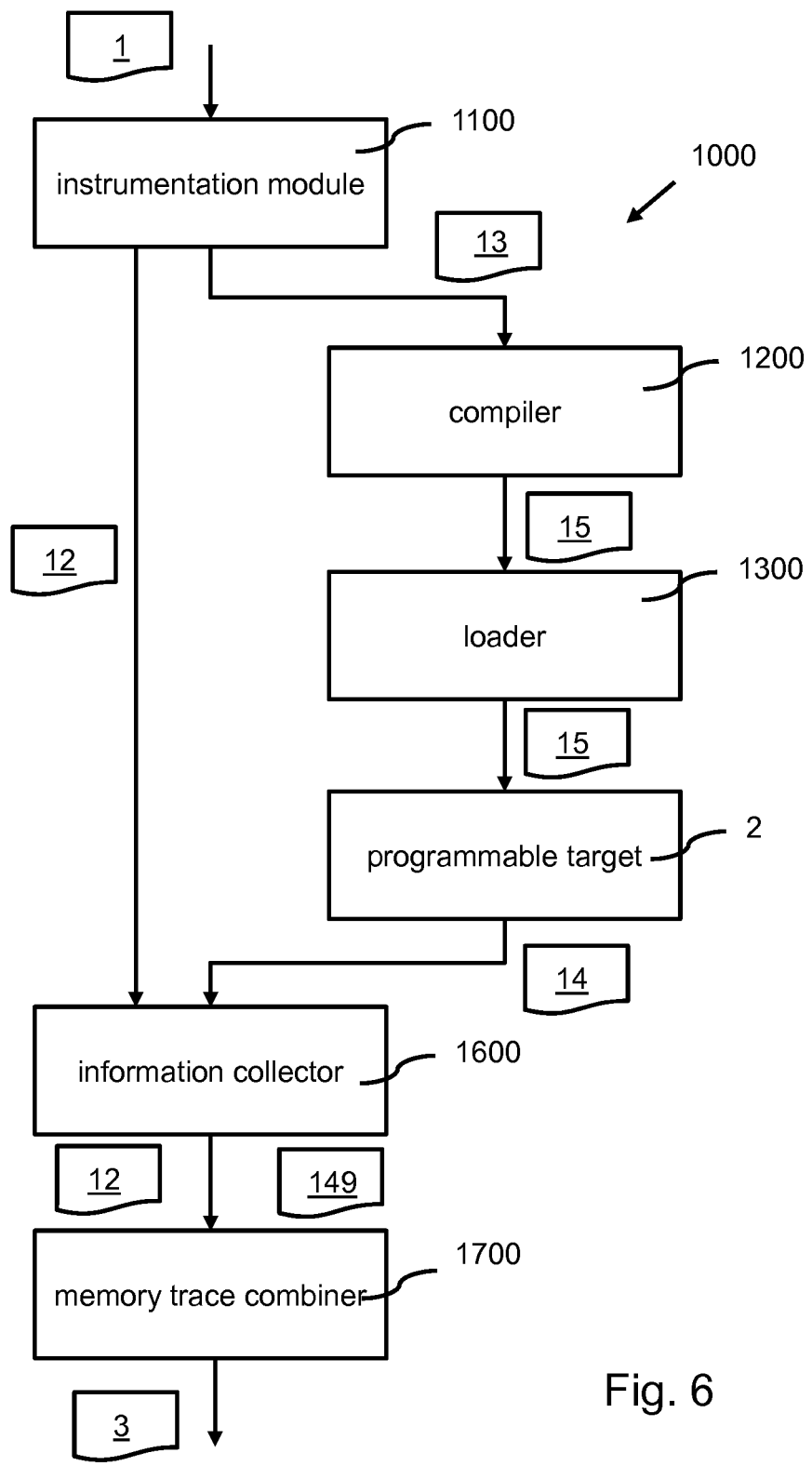
FIG. 6 schematically shows an example of an embodiment of a system.

FIG. 6 show a system 1000 for generating a memory trace of a program code 1 when executed on a programmable target 2. The system 1000 comprises an instrumentation module 1100, a compiler 1200, a loader 1300, an information collector 1600 and a memory trace combiner 1700. In a further embodiment, a linker may be provided in between the compiler 1200 and the loader 1300. The instrumentation module 1100 is arranged to analyse the program code to detect a loop nest with regular memory access in the program code, provide a record of static memory address information associated with the loop nest, and instrument the program code to provide an instrumented code comprising the program code supplemented with an instrumentation instruction to output an information message comprising a dynamic memory address information field formatted to store a dynamic memory address information associated with the loop nest. In an embodiment, the instrumenting may be performed without user intervention. The compiler 1200 is arranged to compile the instrumented code to obtain an instrumented executable program arranged to be executed on the programmable target having been loaded in the programmable target. A linker may further be provided to equip the instrumented executable program as obtained from the compiler 1200 with library components from a library. The loader 1300 is arranged to load the instrumented executable program to the programmable target. The information collector 1600 is arranged to receive the record of static memory address information from the instrumentation module and to, when the instrumented executable program is executed on the programmable target, receive the information message from the programmable target, to extract the dynamic address information from the information message, and to collect the dynamic address information to obtain a record of the dynamic address information. The memory trace combiner 1700 is arranged to receive the record 12 of static memory address information and the record 149 of the dynamic address information and to generate the memory trace 3 from at least combining the record of static memory address information and the record of the dynamic address information. The system 1000 may thus reduce the necessary bandwidth to output the memory trace from the hardware target, while still allowing a full reconstruction of the memory trace from combining the record of static memory address information and the record of the dynamic address information. The system 1000 may be advantageous as to required trace buffer size on the programmable target and/or as to effects of instrumentation on the execution speed.

The instrumentation module 1100 may further be arranged to, in analysing the program code, detect a loop nest with regular memory access in the program code and, for each loop nest generate a memory access pattern function as a function describing a memory address pattern of the loop nest in terms of a start address and a loop iteration variable, generate memory access pattern parameters representing at least an instruction address and a size of a memory access, and generate the static memory address information from at least the memory access pattern function and the memory access pattern parameters The instrumentation module 1100 may further be arranged to, in instrumenting the program code, format the dynamic memory address information field to allow storing a dynamic memory address information representing at least a runtime value of the instruction address, a runtime value of the start address and a runtime value of an iteration count of loop variables of the loop nest.

Figure 7:
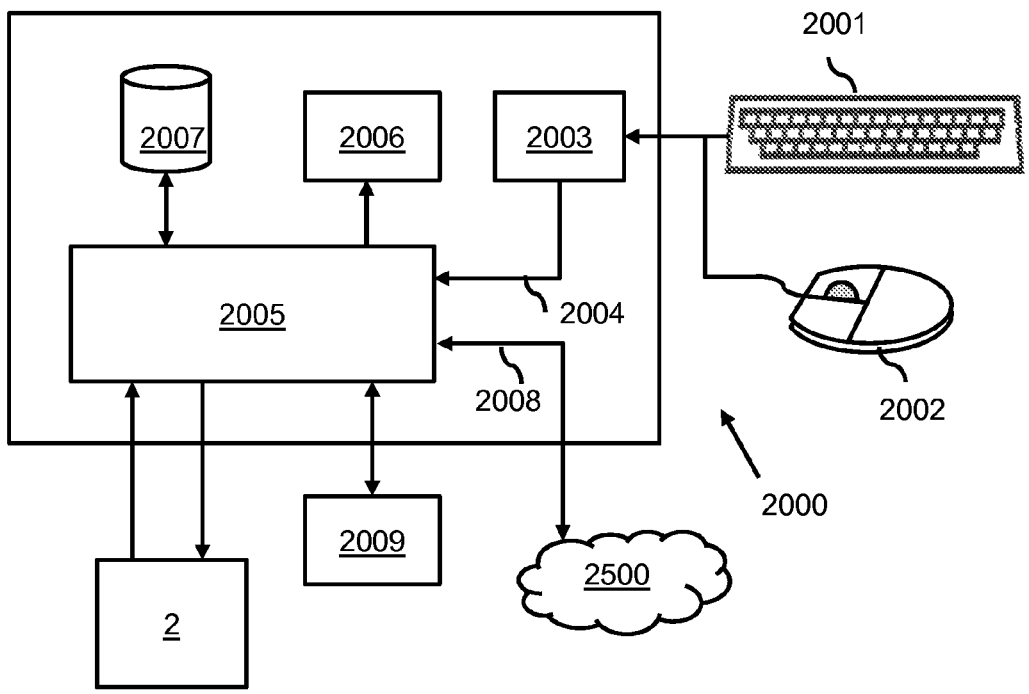
FIG. 7 schematically shows an exemplary user interaction system using an embodiment of a system.

FIG. 7 schematically shows an exemplary user interaction system 2000 having a programmable processor 2005. The user interaction system 2000 is shown to be a personal computer, but may be any type of suitable user interaction system 2000. The programmable processor may comprise the system 1000 described above with reference to FIG. 6, or just comprise a subset of its components. The programmable processor 2005 of a specific user interaction system 2000 may e.g. comprise just comprises an instrumentation module 2000, a compiler 1200 and a loader 1300, while the programmable processor 2005 of another user interaction system may e.g. comprise just an information collector 1600 and a memory trace combiner 1700. The programmable processor 2005 is arranged to be able to communicate with a programmable target 2 as indicated. The user interaction system 2000 further comprises a storage unit 2007, a user input 2003 and a display 2006. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the invention, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007, such as the record of static memory address information and the record of dynamic memory address information, or even the full, generated memory trace. The user interaction system 2000 may further comprise a communication channel 2008 allowing the processor 2005 to connect to an external cloud 2500 for communicating with other devices in the cloud. The external cloud may e.g. be the Internet. The user interaction system 2000 may allow generation, inspection and further processing of memory traces by a user. The processor 2005 may also be arranged to retrieve the record of static memory address information and the record of dynamic memory address information from the storage unit 2007, or from another device in the cloud 2500, and generate the memory trace from combining the record of static memory address information and the record of dynamic memory address information offline by the processor 2005. The processor 2005 may be capable to read, using the data I/O device 2009, a computer readable medium comprising a program code 1 executable on a programmable target 2. The processor 2005 may be capable to read, using the data I/O device 2007, a computer readable medium comprising a computer program product comprising instructions for causing the system 1000 to perform a method of generating an instrumented code 13 from a program code 1 executable on the programmable target 2. The processor 2005 may be capable to read, using the data I/O device 2007, a computer readable medium comprising a computer program product comprising instructions for causing the system 1000 to perform a method of generating an instrumented code 13 from a program code 1 executable on a programmable target 2.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Figure 8:
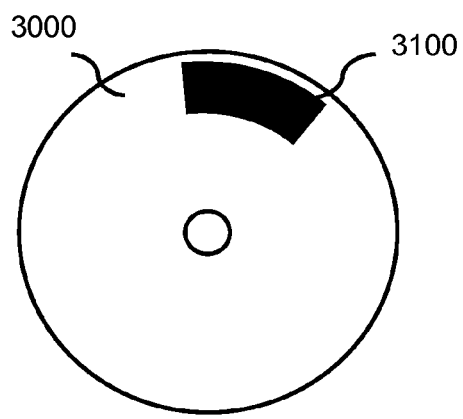
FIG. 8 and FIG. 9 schematically shows an example of an embodiment of a computer readable medium comprising a computer program.

FIG. 8 shows a computer readable medium 3000 comprising a computer program product 3100, the computer program product 3100 comprising instructions for causing a processor apparatus to perform a method of generating an instrumented code 13 from a program code 1 executable on a programmable target 2 according to an embodiment. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 8 as an optical disc, the computer readable medium 3000 may be any suitable computer readable medium, such as a hard disk, solid state memory, flash memory, etc., and may be non-recordable or recordable. The computer program product 3100 comprises instructions for causing a processor system to perform a method comprising obtaining a program code suitable to be executed on a programmable target, analysing the program code to detect a loop nest with regular memory access in the program code, providing a record of static memory address information associated with the loop nest, and instrumenting the program code to provide an instrumented code comprising the program code supplemented with an instrumentation instruction to output an information message comprising a dynamic memory address information field formatted to store a dynamic memory address information associated with the loop nest.

In a further embodiment, the providing a record of static memory address information associated with the loop nest comprises generating a memory access pattern function as a function describing a memory address pattern of the loop nest in terms of a start address and a loop iteration variable, generating memory access pattern parameters representing at least an instruction address and a size of a memory access, and generating the static memory address information from at least the memory access pattern function and the memory access pattern parameters.

In a further embodiment, the instrumenting comprises formatting the dynamic memory address information field to allow storing a dynamic memory address information representing at least a runtime value of the instruction address, a runtime value of the start address and a runtime value of an iteration count of loop variables of the loop nest.

Figure 9:
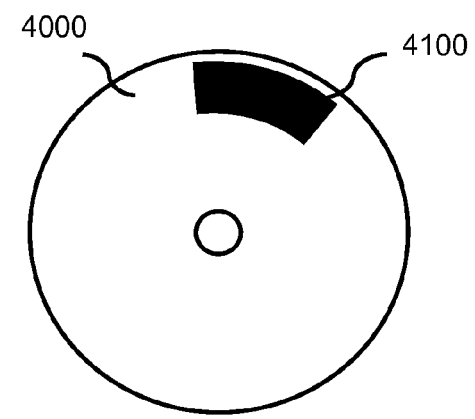

FIG. 9 shows another computer readable medium 4000 comprising another computer program product 4100, the computer program product 4100 comprising instructions for causing a processor apparatus to perform a method of generating an instrumented code 13 from a program code 1 executable on a programmable target 2 according to an embodiment. The computer program product 4100 may be embodied on the computer readable medium 4000 as physical marks or by means of magnetization of the computer readable medium 4000. However, any other suitable embodiment is conceivable as well. Furthermore, it will be appreciated that, although the computer readable medium 4000 is shown in FIG. 9 as an optical disc, the computer readable medium 4000 may be any suitable computer readable medium, such as a hard disk, solid state memory, flash memory, etc., and may be non-recordable or recordable. The computer program product 4100 comprises instructions for causing a processor system to perform a method of generating a memory trace 3, the method comprising obtaining a record of static memory address information generated by a method of generating an instrumented code from a program code suitable to be executed on a programmable target according to an embodiment described above; obtaining a record of dynamic address information from receiving an information message from a programmable target, extracting the dynamic address information from the information message, and collecting the dynamic address information to obtain a record of the dynamic address information from a programmable target executing an instrumented executable program as generated from compiling instrumented code generated from the program code by a method of generating an instrumented code from the program code according to an embodiment described above; and generating a memory trace from at least combining the record of static memory address information and the record of the dynamic address information.

The described methods and systems may be used with a programmable target of the same type as used in a practical application or in an practical system. The described methods and systems may also be used with a programmable target that performs an emulation of a programmable processor of a different type or even with a programmable target that performs an emulation of a non-programmable processor of a practical application or practical system. Such emulation may e.g. be advantageously used during the application or system development stage.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer one The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although the figures and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method comprising:

analyzing, by an instrumentation module stored on a computer readable storage medium to be executed by a programmable processor coupled to the computer readable storage medium, a program code for a target processor to detect a loop nest of the program code having regular memory access and a location of the detected loop nest in the program code, wherein a loop nest is associated with an instruction address and includes a loop iteration variable indicating a number of iterations of the loop nest;

determining, by the instrumentation module, a memory access pattern of the loop nest based on memory access instructions in the loop nest;

providing, based on the analyzing, a record of a static memory address information associated with the loop nest, wherein providing the record of the static memory address information associated with the loop nest includes:

generating a memory access pattern function describing the memory address pattern of the loop nest by a start address of the memory access pattern of the loop nest and the loop iteration variable, generating memory access pattern parameters representing the instruction address and a size of a memory access based on the loop iteration variable, and generating the static memory address information from the memory access pattern function and the memory access pattern parameters;

instrumenting, by the instrumentation module, the program code to provide an instrumented code for the target processor comprising the program code supplemented with an instrumentation instruction inserted at an entry position of the detected loop nest based on the location of the detected loop nest, the instrumentation instruction to be executed only once per instantiation of the loop nest and to output an information message during runtime by the target processor that comprises a dynamic memory address information field formatted to store a dynamic memory address information associated with the loop nest that indicates a runtime value of a start address of the memory access pattern of the loop nest based on the loop nest and the memory access pattern of the loop nest, wherein the information message is based on the record of the static memory address information; and storing and compiling, by the target processor, the instrumented code for the target processor for executing the instrumented code to generate a memory trace for the loop nest.

2. The method according to claim 1, wherein the dynamic memory address information field is further formatted to store in respective information fields a runtime value of an instruction address related to the loop nest, the runtime value of the start address of the memory access pattern of the loop nest, and a runtime value of an iteration count of loop variables of the loop nest.

3. The method of claim 1 further comprising:

compiling, by the programmable processor, the instrumented code to obtain an instrumented executable program for execution by the target processor;

loading, by a linker executed by the programmable processor, the instrumented executable program in the target processor;

storing, by the instrumented executable program executed by the target processor, the dynamic memory address information in the dynamic memory address information fields of the information message;

sending, by the instrumented executable program, the information message to the programmable processor;

receiving, by an information collector stored on the computer readable storage medium executed by the programmable processor, the information message from the target processor;

extracting, by the information collector, the dynamic address information from the information message;

collecting, by the information collector, the dynamic memory address information to obtain a record of the dynamic memory address information; and generating, by a memory trace combiner stored on the computer readable storage medium executed by the programmable processor, the memory trace of the program code executable based on the record of static memory address information and the record of the dynamic address information.

4. A computer program product comprising instructions for causing the processor system to perform a method comprising:

obtaining, by an information collector stored on the computer readable storage medium executed by the programmable processor, the record of static memory address information associated with the loop nest provided by the method according to claim 1;

receiving, by the information collector, the information message from the target processor;

extracting, by the information collector, the dynamic address information from the information message;

collecting, by the information collector, the dynamic address information to obtain a record of the dynamic address information; and generating, by a memory trace combiner stored on the computer readable storage medium executed by the programmable processor, a memory trace of the program code executable based on the record of static memory address information and the record of the dynamic address information.

5. A system comprising:

a programmable processor coupled to a computer readable storage medium configured to execute:
  an instrumentation module configured to:
    analyze a program code for a target processor to detect a loop nest of the program code having regular memory access and a location of the detected loop nest in the program code, wherein a loop nest is associated with an instruction address and includes a loop iteration variable indicating a number of iterations of the loop nest;
    determine a memory access pattern of the loop nest based on memory access instructions in the loop nest;
    provide, based on the analyzing, a record of static memory address information associated with the loop nest by:
      generating a memory access pattern function describing the memory address pattern of the loop nest by a start address of the memory access pattern of the loop nest and the loop iteration variable,
      generating memory access pattern parameters representing the instruction address and a size of a memory access based on the loop iteration variable, and
      generating the static memory address information from the memory access pattern function and the memory access pattern parameters; and
    instrument the program code to provide an instrumented code for the target processor comprising the program code supplemented with an instrumentation instruction at an entry point of the loop nest, the instrumentation instruction to be executed only once per instantiation of the loop nest and to output an information message during runtime by the target processor, that comprises a dynamic memory address information field formatted to store a dynamic memory address information associated with the loop nest, that indicates a runtime value of a start address of the memory access pattern of the loop nest and the memory access pattern of the loop nest, wherein the information message includes a runtime value of the instruction address;
  a compiler configured to compile the instrumented code to obtain an instrumented executable program for the target processor;

a loader to load the instrumented executable program for the target processor;
an information collector to:
  receive the record of static memory address information from the instrumentation module;
  receive, when the instrumented executable program is executed by the target processor, the information message from the target processor;
  extract the dynamic address information from the information message; and
  collect the dynamic address information to obtain a record of the dynamic address information; and
a memory trace combiner to generate a memory trace for the loop nest based on combining the record of static memory address information with the record of the dynamic address information.

6. The system according to claim 5, wherein the dynamic memory address information field is further formatted to store in respective information fields a runtime value of an instruction address related to the loop nest, the runtime value of the start address of the memory access pattern of the loop nest, and a runtime value of an iteration count of loop variables of the loop nest.

7. A method comprising:

analyzing, by an instrumentation module stored on a computer readable storage medium to be executed by a programmable processor coupled to the computer readable storage medium, a program code for a target processor to detect a loop nest of the program having regular memory access and a location of the detected loop nest in the program code, wherein a loop nest is associated with an instruction address and includes a loop iteration variable indicating a number of iterations of the loop nest;

determining, by the instrumentation module, a memory access pattern of the loop nest based on memory access instructions in the loop nest;

providing, based on the analyzing, a record of static memory address information associated with the loop nest, wherein providing the record of the static memory address information associated with the loop nest includes:
  generating a memory access pattern function describing the memory address pattern of the loop nest by a start address of the memory access pattern of the loop nest and the loop iteration variable,
  generating memory access pattern parameters representing the instruction address and a size of a memory access based on the loop iteration variable, and
  generating the static memory address information from the memory access pattern function and the memory access pattern parameters;

instrumenting, by the instrumentation module, the program code to provide an instrumented code for the target processor comprising the program code supplemented with an instrumentation instruction inserted at an exit point of the detected loop nest based on the location of the detected loop nest, the instrumentation instruction to be executed only once per instantiation of the loop nest and to output an information message during runtime by the target processor that comprises a dynamic memory address information field formatted to store a dynamic memory address information associated with the loop nest that indicates a runtime value of a start address of the memory access pattern of the loop nest based on the loop nest and the memory access pattern of the loop nest, wherein the information message is based on the record of the static memory address information; and storing and compiling, by the target processor, the instrumented code for the target processor for executing the instrumented code to generate a memory trace for the loop nest.

8. The method according to claim 7, wherein the dynamic memory address information field is further formatted to store in respective information fields a runtime value of an instruction address related to the loop nest, the runtime value of the start address of the memory access pattern of the loop nest, and a runtime value of an iteration count of loop variables of the loop nest.

* * * * *